Dec. 17, 1963 J. D. SANTI 3,114,851
INDUCTANCE DEVICE, PARTICULARLY FOR INTERNAL
COMBUSTION ENGINE IGNITION
Filed Oct. 11, 1961 5 Sheets-Sheet 4

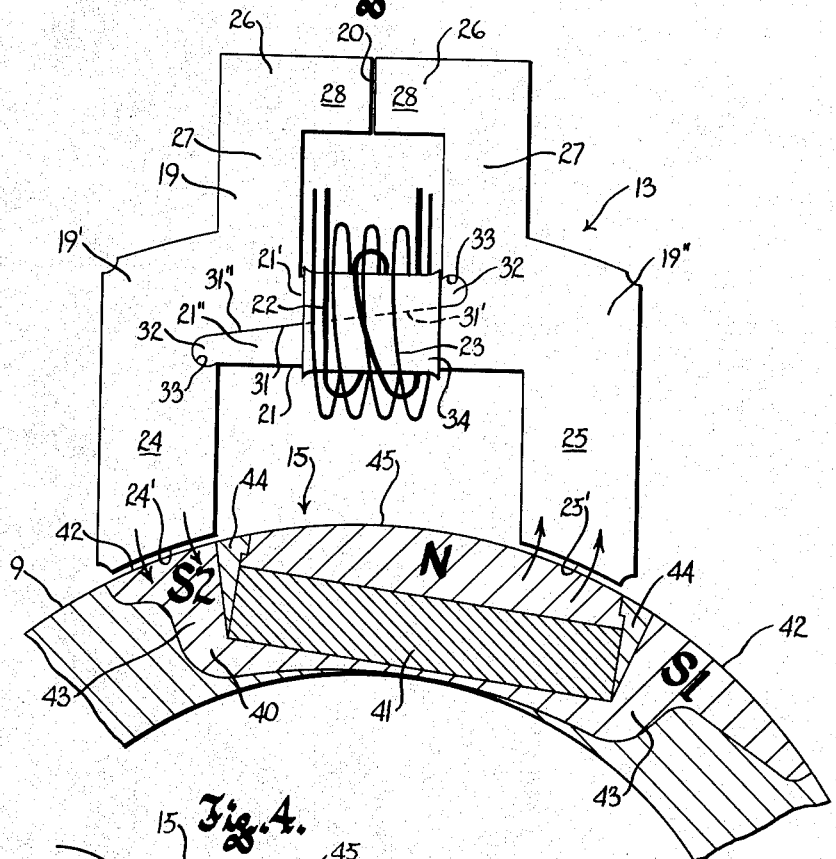
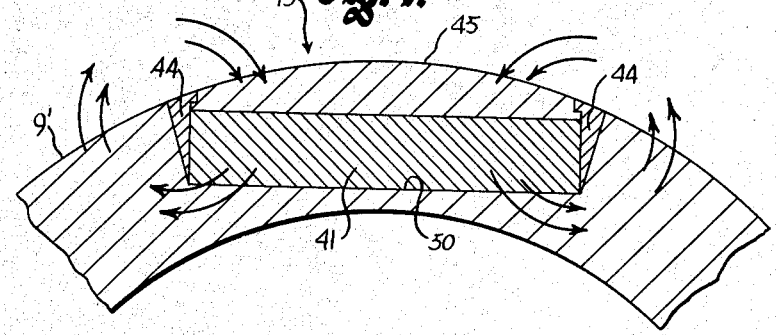

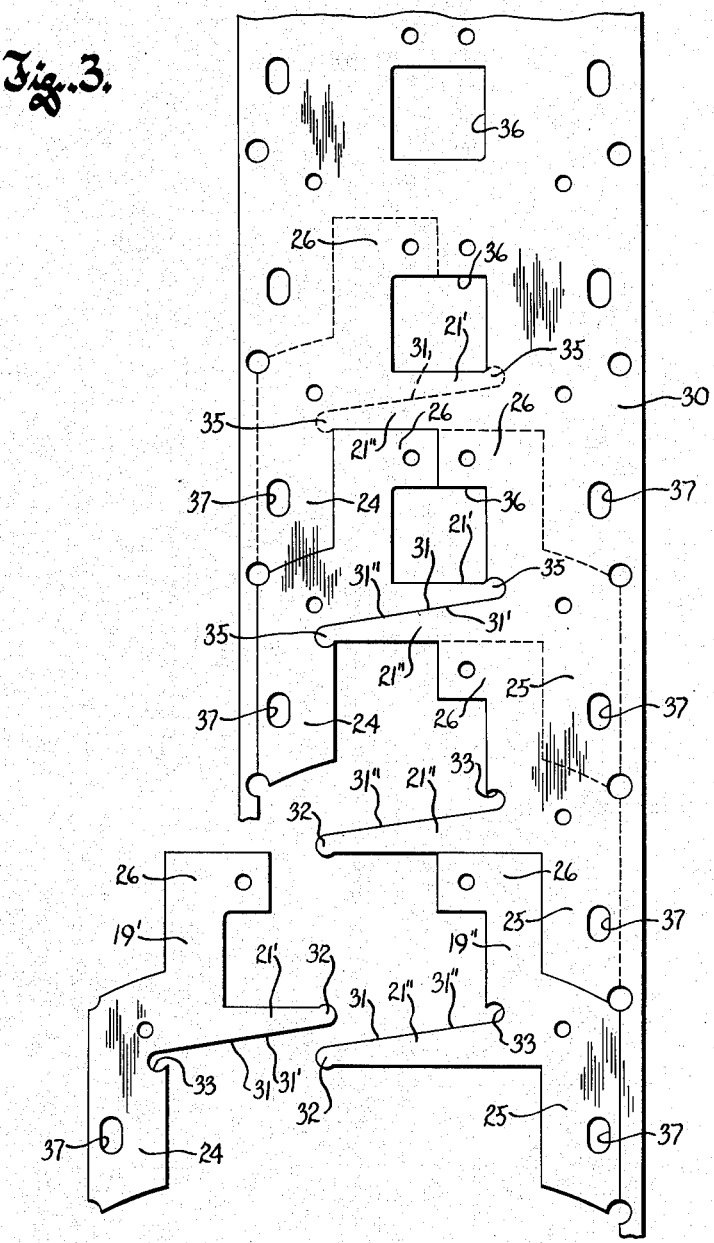

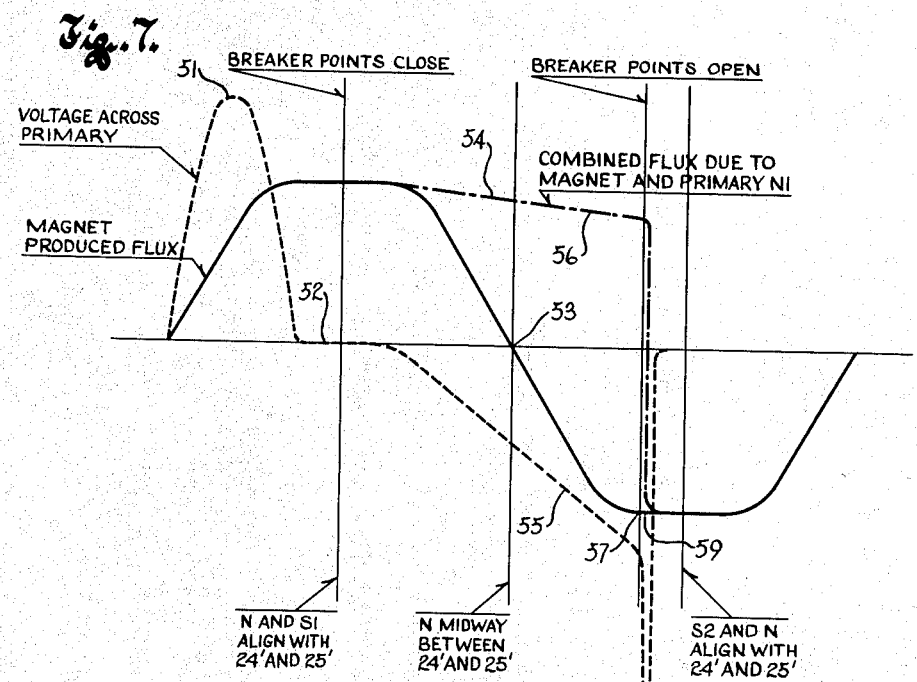
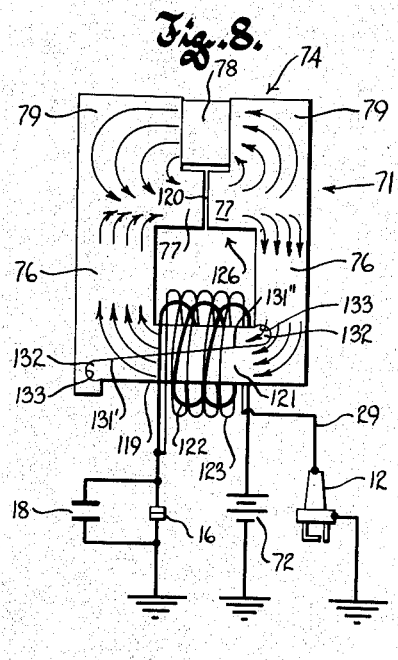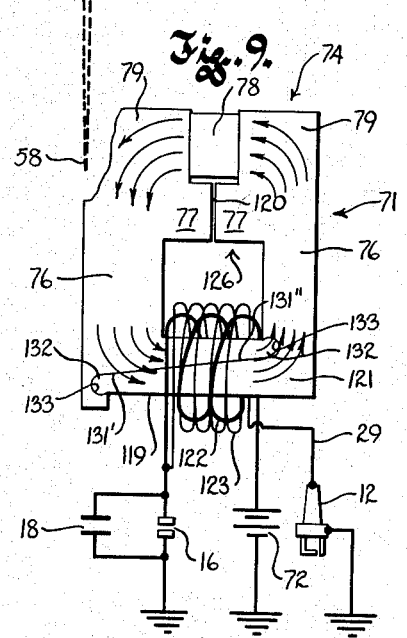

United States Patent Office 3,114,851
Patented Dec. 17, 1963

3,114,851
INDUCTANCE DEVICE, PARTICULARLY FOR INTERNAL COMBUSTION ENGINE IGNITION
John D. Santi, Milwaukee, Wis., assignor to Briggs & Stratton Corporation, Milwaukee, Wis., a corporation of Delaware
Filed Oct. 11, 1961, Ser. No. 149,140
21 Claims. (Cl. 310—153)

This invention relates to inductance devices for internal combustion engine ignition, and refers more particularly to improvements in battery ignition coils and magnetos whereby they can be produced at lower cost than has heretofore been possible while nevertheless affording superior performance. While the invention is herein described with particular reference to so-called flywheel magnetos such as are commonly used on single cylinder engines, and the invention is especially advantageous in magnetos of that type, it will be seen that it is also adaptable to other types of magnetos, as well as to battery ignition coils.

The present invention has as one of its principal objects the attainment of a very considerable reduction in the cost of internal combustion engine magnetos, by making it possible to very substantially reduce the amount of copper wire required in the coils of the magneto.

The principal objective of the invention is additionally furthered by the fact that the primary can be wound of somewhat finer wire than has heretofore been conventional, thus in effect compounding the saving in copper. This results from the lesser number of turns in the primary, and its consequently lowered resistance, so that relative reduction in the cross section of the wire comprising it does not increase its resistance above that of the primaries of comparable prior magnetos.

From what has been said above, it will be seen that it is another object of this invention to reduce the distributed capacitance of the secondary winding of a magneto of the character described. The attainment of this objective follows as a consequence of reduction of the number of turns in the secondary winding. With reduction in the distributive capacitance of the secondary, the amount of energy required to charge the coil capacitance to a given voltage is reduced, and the overall efficiency of the magneto is proportionately increased.

More specifically, it is an object of this invention to provide an armature for a magneto of the character described having a core that comprises ferromagnetic means affording a low reluctance shunt path for flux due to the ampere-turns of the primary whereby such flux is substantially confined to the iron of the core, and hence maintained fully linked with the windings rather than leaking across the air space or spaces between the legs of the core without cutting the windings, and whereby a tight coupling is provided between the primary and secondary windings which contributes to efficiency and reduces the amount of copper required for the coils.

It is a further object of this invention to provide a core for a magneto armature wherein the flux fields linked with the windings have an unusually high density at their peak values, and wherein the rate of change of flux at breaker point opening is likewise unusually high, to thus cause a very high voltage to be induced across each turn of the secondary and thereby make possible the successful employment of a secondary having a relatively small number of turns.

It must be borne in mind that in the design of a magneto armature or an ignition coil for a battery ignition system, the breaker points by which the primary circuit is alternately closed and opened present critically severe limitations upon what can and cannot be done. In particular, conventional breakers are limited in the amount of power they can efficiently and repeatedly interrupt. Thus it is well known that the maximum potential that can be handled by the breakers is about 260 volts, and the maximum current that can be applied across them is about 4½ amperes. There is little interchangeability in these limits; that is, the 4½ amp. current limit cannot be substantially exceeded by reducing the peak potential below 260 volts.

Heretofore any proposal to decrease the number of turns in the primary by increasing the density of flux linked with the windings would have run head on into the limitations imposed by the breaker points. If the maximum value of flux linked with the coils could have been increased with the ignition inductance devices heretofore used, and the number of turns in the primary decreased proportionately, the voltage across the breaker points could have been kept within tolerable limits, but the current across them would nevertheless have been increased to an excessive value, due to the substantially open magnetic circuits of prior cores.

By contrast, the present invention has as another of its objects the provision of means in the core of a magneto armature or battery ignition coil defining a path for flux due to the primary ampere-turns having an air gap that is very substantially shorter than the leakage path air gaps of prior cores, thus providing for a reduction of the peak current across the breakers for a given number of primary turns while at the same time increasing the maximum flux density linked with the secondary for a given value of ampere-turns in the primary coil, so that the number of turns in the primary can be materially less than that in the primaries of prior inductance devices.

Another and very important object of this invention is to provide a configuration for the core of a magneto armature or a battery ignition coil which makes possible the predetermination of the reluctance of the magnetic circuit associated with the primary, and hence makes it possible to calculate with substantial accuracy the number of turns of primary required for a given inductance device and therefore also the number of turns required for the secondary. This is in marked contrast to prior battery coils and magnetos, wherein leakage of flux due to the ampere-turns of the primary was virtually unpredictable, so that design of the windings and their core was essentially a cut-and-try procedure that was facilitated to only a slight extent by empirical data.

From the standpoint of production economy the invention has as another of its objects to provide such a magneto core which is comprised of only two stacks of laminations, all of the laminations in each stack being identical and the laminations of the two stacks being so shaped that when one is punched out of a sheet of lamination material the other is partially defined by such punching operation, so that accurate mating of the laminations of the two stacks is assured by the manner of their production.

Another object of this invention resides in the provision of a magneto which is capable of effecting firing of a spark plug despite a substantial carbon deposit on it, even when the plug is fouled to an extent that would prevent a prior magneto from producing a spark.

A further object of this invention is to provide a magneto of the character described which is particularly useful with very high speed engines, such as two-cycle engines, with which a prior magneto would be ineffective. This objective is attained in the magneto of this invention because of the higher natural frequency of its secondary and the consequently faster rate of voltage rise across it.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which:

FIGURE 2 is a more diagrammatic fragmentary elevational view of the magneto shown in FIGURE 1, but with the flywheel rotated to a position beyond that shown in FIGURE 1;

FIGURE 3 is a view of several laminations of the core members of the magneto of this invention in relation to a strip of stock from which they are stamped, showing how the configuration of the laminations allows them to be stamped out of the strip with very little waste of material;

FIGURE 4 is a fragmentary sectional view of a cast iron flywheel for a flywheel magneto embodying the principles of this invention;

FIGURE 7 is a graph of the flux and voltage relationships which obtain in the magneto armature of this invention during each ignition cycle;

FIGURE 8 is a more or less diagrammatic view of a battery ignition system having a coil embodying the principles of this invention, showing flux conditions at a moment when the breaker points are closed to apply battery current to the primary; and FIGURE 9 is a view similar to FIGURE 8, but showing the flux condition that obtains when the breaker points open.

Figure 1:
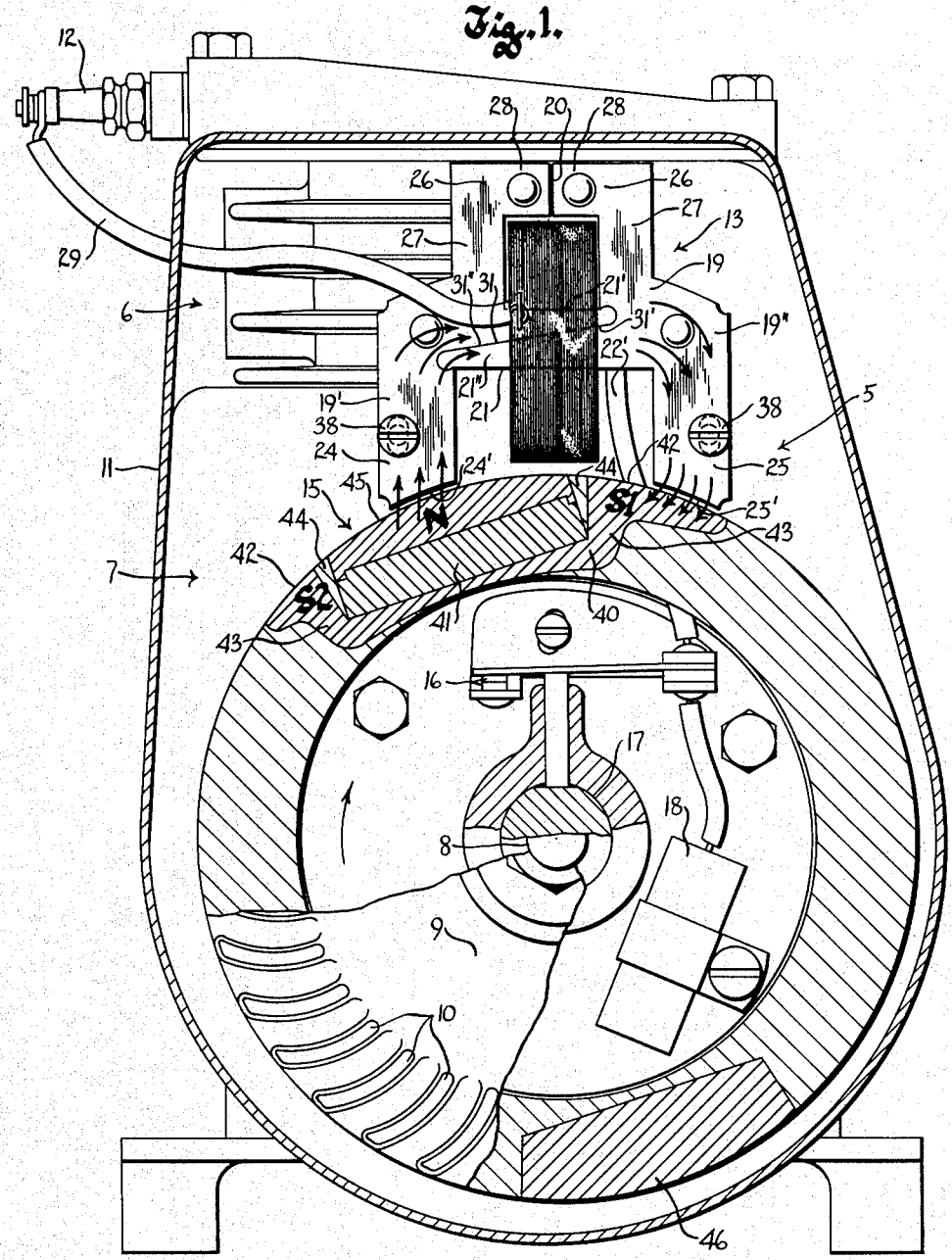
FIGURE 1 is a view partly in elevation and partly in section of a single cylinder engine having a flywheel magneto embodying the principles of this invention, the flywheel of the engine being an aluminum casting and being shown in the position in which the permanent magnet carried thereby is charging the armature core with flux.

The invention is first described with reference to its embodiment in a magneto, and, by way of illustration, with particular reference to a flywheel magneto.

Referring now more particularly to the accompanying drawings, the numeral 5 designates generally the main body of a single cylinder gasoline engine, comprising a cylinder portion 6, and a crankcase portion 7. On one end of the crankshaft 8 of the engine there is mounted a flywheel 9 which has vanes 10 on its exterior so that it can serve as a blower or air impeller. In the case of the engine illustrated in FIGURES 1 and 2 the flywheel 9 is an aluminum casting. The flywheel 9' of the engine shown in FIGURE 4 is of cast iron, but is otherwise generally similar to the aluminum flywheel, especially in that it comprises a blower. In each case, cooling air from the flywheel blower is guided over the cylinder 6 by means of a generally conventional shroud or blower housing 11.

The magneto of this invention, by which high voltage current is supplied to a spark plug 12, comprises a novel armature 13 which is mounted on the exterior of the cylinder 6 of the engine body and upon which a primary coil 22 and a secondary coil 23 are wound, a magnet element 15 which is carried on the rim portion of the flywheel, conventional breaker points 16 which are actuated by a cam mechanism 17, and a condenser 18.

As is conventional, the spark plug 12 is connected to one terminal of the secondary 23 by means of an insulated high tension lead 29, while the other side of the spark plug and the opposite secondary terminal are grounded through the engine structure. Likewise conventional is the connection of one terminal of the primary 22 to one of the breaker points 16 by means of a conductor 22', while the other primary terminal and the other breaker point are grounded. The condenser 18 is of course connected across the breaker points.

The cam actuated breaker points and the condenser can be mounted on the engine crankcase, under the flywheel and within its rim portion, while the armature 13 of the magneto is mounted outside the periphery of the flywheel, in a position where cooling air from the blower can flow across it, but adjacent to the flywheel rim so as to cooperate with the magnet element 15.

The armature 13 of the magneto of this invention has a laminated core 19 that is substantially A-shaped, but which has a small air gap 20 at its apex. The cross bar of the A provides a coil supporting section 21 upon which the primary and secondary coils 22 and 23 are concentrically wound. The downwardly projecting leg portions 24 and 25 of the armature core terminate in pole faces 24' and 25' respectively, and together with the coil supporting section 21 they may be considered as defining a substantially U-shaped lower portion of the core that provides a low reluctance path for flux charged into the core by the magnet element 15.

The convergent upper portion of the armature core, which defines the air gap 20, provides a flux shunt portion 26 that comprises a pair of L-shaped leg elements having their stem portions 27 integrally joined to the coil supporting section 21 near the ends thereof and extending oppositely to the pole legs 24 and 25, and having their base portions 28 projecting toward one another across the outside of the coils. The air gap 20 between the base portions 28 is a very small one, having a length in the neighborhood of .015 to .025 in., which is on the order of the thickness of a sheet of bond paper. Other features of the armature core are described hereinafter.

The magnet element 15 provides three circumferentially adjacent poles at one side of the flywheel, in this case shown as a north pole N and a pair of south poles S1 and S2 at opposite circumferential sides of the north pole. Obviously the permanent magnet element could as well provide a pair of north poles with a south pole between them. The circumferential spacing of the poles is such that pairs of magnetically opposite poles can be in simultaneous radial alignment with the pole faces 24' and 25'. Attention is directed to the fact that each of the poles of the permanent magnet element has a circumferential length which is substantially greater than that of the pole faces 24' and 25' of the armature core, so that each pole of the permanent magnet element remains aligned with a pole leg of the armature core through a substantial angle of flywheel rotation.

As the flywheel rotates (clockwise in this case) toward the position illustrated in FIGURE 1, at which a pair of magnetically opposite poles N and S1 of the permanent magnet element come into radial alignment with the pole faces 24' and 25' respectively of the armature core, flux is charged into the core through its substantially U-shaped lower portion. Such flux has little or no tendency to thread the flux shunt portion 26 of the core because of the air gap 20 therein, and it is therefore concentrated in the coil supporting section 21, where it is of course linked with the coils.

While the poles S1 and N of the permanent magnet element are moving toward the FIGURE 1 position, the breaker points are open, having remained open during most of the cycle of flywheel rotation. During the time that the magnet poles are approaching full alignment with the core legs 24 and 25, flux through the core builds at a more or less rapid rate, depending upon the rotational speed of the flywheel, and consequently a fairly high voltage is induced across each of the coils, as indicated at 51 in FIGURE 7. With a conventional magneto the secondary voltage thus induced could give rise to a non-breaker produced or maverick spark, particularly at high engine speeds. However, because the poles of the permanent magnet element of the magneto of this invention are substantially longer circumferentially than the armature pole faces 24' and 25', the rate of rise of flux through the core is considerably lower, at any given flywheel speed, than with a prior magneto, and consequently the voltage across each turn of the secondary is lower. Moreover, the substantially smaller number of turns in the secondary further insures that the voltage across the entire secondary will not reach the spark plug breakdown value, so that no maverick spark can occur.

Because of their circumferential extension, the magnet poles S1 and N remain in full alignment with the armature pole faces 24' and 25' through a substantial angle of flywheel rotation during which flux charged into the armature core remains at a substantially constant peak value. Since there is practically no change in flux density through the core at this time, there is no voltage across the windings, as indicated at 52 in FIGURE 7. It is during this interval, and preferably when the flywheel is in exactly its FIGURE 1 position, that the breaker points close. As explained hereinabove, closure of the breaker points at a time when there is no voltage across the primary, and therefore no charge on the condenser 18, insures long breaker point life.

As the flywheel continues its rotation to carry the magnet poles S1 and N out of alignment with the pole faces 24' and 25', the magnet-charged flux through the core first diminishes, going to zero at about the instant when magnet pole N crosses a point circumferentially intermediate armature pole faces 24' and 25' (point 53 in FIGURE 7), and then builds in the opposite direction as magnet poles N and S2 are carried toward the FIGURE 2 position in which they are respectively in radial alignment with armature pole faces 25' and 24'. However, the actual net flux, as indicated at 54 in FIGURE 7, does not change in this fashion because the changing magnet-charged flux induces a current in the short circuited primary that strongly opposes the magnet-charged field and tends to sustain the flux field that was charged into the core by the magnet element when the latter was in its FIGURE 1 position. (The voltage across the primary is designated by 55 in FIGURE 5, but it must be borne in mind that actual current flow through the primary terminates at opening of the breakers.) During the period in which the breaker points remain closed, to short circuit the primary and allow current to flow therein, the net flux in the armature, designated by 56, undergoes only a relatively very small change, even though the magnet-charged flux has reversed its polarity.

The breaker points open a few degrees of flywheel rotation after magnet pole N crosses the point circumferentially intermediate armature poles 24' and 25', just as the magnet poles N and S2 arrive at their FIGURE 2 position, so that the magnet-charged flux field is then at a peak value of the FIGURE 2 polarity, as at 57.

With the opening of the breaker points and consequent termination of current flow through the primary, the flux due to the ampere-turns of the primary collapses, as at 58, leaving substantially only the flux due to the magnet, as at 59.

With prior armatures much of the flux due to the ampere-turns of the primary could not thread the core, due to the opposing flux charged into the core by the permanent magnet, and it had to leak across the air gap or gaps between legs of the core. Such leakage flux was not linked with the windings and therefore it could not accomplish the important function of causing an abrupt change, at breaker point opening, of the flux actually linked with the windings.

However, in the armature of the present invention the flux due to the current flowing in the primary immediately prior to breaker point opening threads the low reluctance path provided by the flux shunt portion 26 of the core, rather than leaking unpredictably across various portions of the core. This is the condition illustrated by FIGURE 5. The flux charged into the core by the magnet likewise threads the flux shunt portion, since it is prevented from entering the coil supporting section 21 of the core by the opposing flux produced by the current in the primary. Some of the flux due to the permanent magnet may leak across the air space between the pole legs 24 and 25, but this is of no consequence. What is important is that substantially all of the flux due to the ampere-turns of the primary threads the coils supporting section 21 of the core, where it is linked with the secondary.

Figure 6:
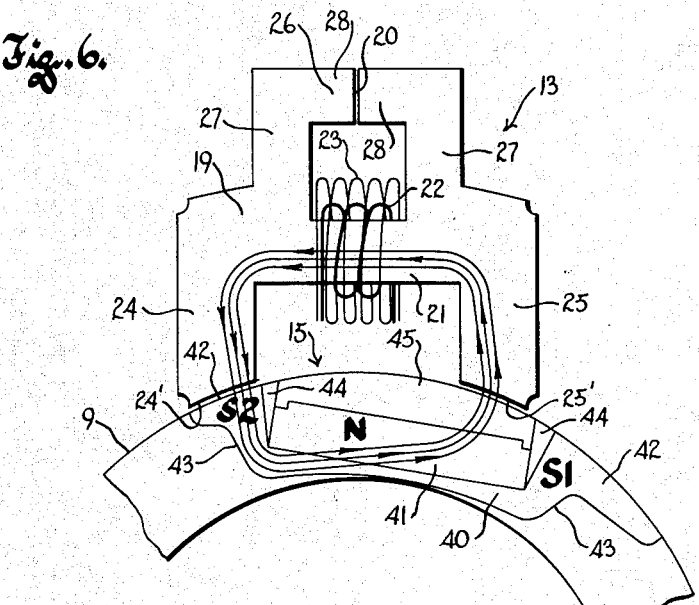
FIGURE 6 is a view similar to FIGURE 5 but showing the flux fields directly after breaker point opening.

When the points open, and the flux field due to the primary ampere-turns collapses, there is an abrupt reversal of the flux field through the coil supporting section 21. From near a saturation value of the FIGURE 1 polarity, at which it had been sustained by the ampere-turns of the primary, flux goes to near a saturation value of the FIGURE 2 polarity as the magnet charged field threads the coil supporting section. The flux condition directly after breaker point opening is illustrated by FIGURE 6. Since practically the entire flux field due to the ampere-turns of the primary is linked with the windings prior to opening of the points, and after breaker opening substantially the entire magnet-charged field threads the coil supporting section of the core, the flux linked with the secondary goes almost instantaneously from at or near a saturation value of one polarity to substantially saturation value of opposite polarity upon opening of the breaker points. Because of the very high rate of change of flux, a very high voltage is induced in each turn of the secondary, allowing a relatively small number of turns to be used to obtain the required ignition voltage.

At this point it should be observed that the flux shunt portion 26 of the core must be located at the side of its coil supporting section 21 which is remote from the orbit of the permanent magnet element, that is, substantially completely out of the influence of leakage flux from the permanent magnet means. If the flux shunt were located at the side of the coil supporting section 21 adjacent to the permanent magnet element, it would merely provide a short circuiting path for flux charged into the core by the permanent magnet, not in flux linking relation with the windings and ineffective to bring about the very abrupt flux reversals in the coil supporting section 21 obtained with the flux shunt portion 26 in the core of this invention.

It is also important to observe that the flux shunt portion 26 in the magneto armature of this invention provides a "controlled" air gap of predetermined size, namely the air gap 20, which makes it possible to pre-establish a desired relationship between the reluctance of the magnetic circuit linked with the primary, the number of turns in the primary, and the energy that can be efficiently handled by the breaker points during normal engine operation. In prior magneto armatures, wherein a substantial portion of the flux field due to the ampere-turns of the primary was forced to take a path outside the iron of the core, across the air gap between the core legs, the reluctance of the path taken by the leakage flux was undeterminable because the exact path taken by the leakage flux could not be visualized with any certainty. It was known, however, that the reluctance of this leakage flux path was relatively very high, that the density of flux linked with the windings was comparatively low, and that the number of turns in the primary (and hence in the secondary) therefore had to be high in order that the induced voltage be high enough.

As pointed out hereinabove, an increase in flux density with an armature having the effectively open magnetic circuit of prior magneto armatures would have been undesirable because the current through the primary would then have exceeded the 4½ amp. limit imposed by the breaker points. With the short air gap 20 in the flux shunt portion 26 of the core of this invention the permeance of the path for flux due to the ampere-turns of the primary is increased to a readily ascertainable high value, so that the flux densities in the core at peak values can be at or near the saturation value of the iron, to insure the induction of the highest possible voltage across each turn of both windings. At the same time, the small size of the air gap 20 has the further and very important effect of limiting the current in the primary to a value which does not exceed the capabilities of the breaker points.

The reason for this will become apparent from a consideration of the magneto armature as an energy storage device. In a literal sense energy is stored in the armature of any magneto during the period when the points are closed, and is released when the points open, its release being manifested by the rapid change of flux in the core and the induction of high voltage ignition current in the secondary. Furthermore the amount of energy thus stored in the armature with a given permanent magnet element is dependent upon the characteristics of the primary and of the core, as may be seen from the formula for the energy that can be stored in an inductance:

$$W = \tfrac{1}{2} LI^2 \qquad (a)$$

wherein energy W is expressed in joules, L is the inductance in henrys, and I is current in amperes.

The inductance L of the primary can be given in terms of the changing flux ($\Delta\Phi$) due to its ampere-turns by:

$$L = \frac{N\Delta\Phi}{I} \cdot 10^{-8} \qquad (b)$$

wherein N is the number of turns in the primary. Hence the Formula $a$ above can be expanded to the form:

$$W = \tfrac{1}{2} NI\Delta\Phi \cdot 10^{-8} \qquad (c)$$

This is, of course, a quantitative statement of the point made above, that the energy stored in the armature is a function of the electrical characteristics of the primary and the magnetic characteristics of the core.

Since the maximum current that can be handled by conventional breaker points is 4½ amps., and the minimum practical value of peak current across the breaker points is about 2 amps., I in the above formulas can be regarded as a constant having any selected value between 2 and 4½, to which the values of $\Delta\Phi$ and N must be tailored. However, NI and $\Delta\Phi$ are interdependent upon one another and are also dependent upon the permeability $\mu$ of the core, its length $l$ and its area A, the relationship for a homogeneous core being given by:

$$\Delta\Phi = A\mu \frac{4\pi NI}{l} \cdot 10^{-9} \qquad (d)$$

This relationship can also be expressed in terms of the reluctance R of the core, in the case of an iron core having an air gap, as:

$$\Delta\Phi = \frac{4\pi NI}{R} \qquad (e)$$

For an iron core having a very large air gap, such as the cores which characterized prior magnetos, the value of R in the immediately preceding formula was high, and therefore the flux density was low. From Formula $c$ above, it will be apparent that such magnetos required a high value of primary NI (ampere-turns) for storage of a given amount of energy, and since the value of I was limited by breaker point capabilities this meant, as a practical matter, that there had to be a large number of turns in the primary, and also of course in the secondary. Stated another way, a high value of primary NI was required in such prior magnetos to drive the flux across the large air gap, and since I was (for practical purposes) a constant, N had to be made large enough to provide that required value of NI.

From Formula $e$ above it can be seen that the relatively low reluctance of the flux shunt portion 26 of the armature core in the magneto of this invention permits the attainment of high values of $\Delta\Phi$ (maximum flux density) for a given value of primary NI (ampere-turns). Referring again to Formula $c$ above, such increase in $\Delta\Phi$ can be accompanied by a decrease in NI for a given energy storage; and, again, since I can be regarded as a constant, this means that the turns of the primary, and hence also of the secondary, can be decreased proportionally as flux density is increased.

Thus it can be said that in the magneto armature of this invention a lower value of primary ampere-turns (NI) is required to drive flux across the small air gap 20, but because of the low reluctance of that air gap the decrease in NI is compensated by an increase in flux density through the shunt portion of the core, and the same amount of energy can be stored in the armature, having the same peak current value, as in prior magnetos, but with a lesser number of turns in the windings.

Equation $d$ above affords a basis for comparing the magnetic characteristics of the armature core of the magneto of this invention with those of prior conventional magneto armature cores. Taking the expression $$\frac{A\mu}{l}$$

in that equation as the permeance P of the entire magnetic circuit, and neglecting numerical constants, Equation $d$ can be restated as:

$$P = \frac{\Delta\Phi}{NI} \qquad (f)$$

Multiplying numerator and denominator by N, $$P = \frac{N\Delta\Phi}{N^2 I} = \frac{L}{N^2} \qquad (g)$$

Hence the permeance can be determined by actual test as a function of the inductance of the windings, and can be expressed in henrys per primary turn squared. With a typical magneto armature of this invention, the permeance of the core is such that the primary winding, when mounted in the apparatus and energized at the basic natural frequency of the ignition system, has an inductance of more than $.25 N^2$ microhenrys, where N is the number of turns in the primary. The basic natural frequency of the system is that at which secondary voltage builds up when the secondary is in the complete ignition system including breaker points and condenser, and can be measured experimentally by opening the spark plug gap to the extent that the plug cannot fire.

The permeance of the core can also be expressed directly in units of permeance, as more than .25 microwebers per ampere-turn of the primary. This follows from the fact that $\Phi = PF$ where $\Phi$ is the flux in webers (1 weber = $10^8$ maxwells), P is, again, permeance and F is mmf., the unit of which is the gilbert. Since F can be expressed as a function of ampere-turns, and is numerically equal to 1.257NI, $$P = \frac{\Phi \text{ (webers)}}{1.257 NI}$$

By contrast with the above values, the armature core of a typical prior magneto has a permeance such that the inductance of its primary, under the above specified conditions, is on the order of $.10N^2$ microhenrys; or in other words, its core has a permeance of .10 microweber per ampere-turn. Note that these values are about one-half of the corresponding values for the magneto of the present invention, confirming the possibility of halving the number of turns in the windings.

The interchangeability of the values of $\Delta\Phi$ and NI in the energy equation made possible by the flux shunt 26 is further realized by reason of the ready adjustability of the air gap 20, as explained hereinafter. Thus the reluctance of the magnetic circuit can be adjusted to afford control of the maximum values of current and voltage to be carried by the primary, assuming that a predetermined number of turns is to be used for the primary, or both the air gap and the number of turns in the primary can be adjusted relative to one another to establish predetermined limits to the power that must be handled by the breakers. The effects of such adjustments can be precomputed with substantial accuracy, using the formulas given above and values obtained from handbooks. Obviously this is in marked contrast to the empiricism that characterized design or modification of prior magneto armatures.

If the relationship between the primary turns and the air gap 20 is maintained within the limits of breaker point capabilities, the maximum voltage across the secondary terminals can be adjusted to any desired value by varying the length of the air gap 20 without making any other change in the magneto. This is because the length of the air gap 20 is one of the factors that controls the energy stored in the armature. Thus with a magneto armature of this invention having a 74-turn primary and a 4400-turn secondary, an air gap .025 inch long produced a secondary output of about 25,000 volts, while a .015 inch air gap produced a 15,000 volt secondary output. These results could actually have been predicted with substantial accuracy before the armature was ever built because for a given core of this invention the length of the air gap 20 is the sole variable controlling reluctance, owing to the fact that substantially all of the flux due to the ampere-turns of the primary threads the flux shunt portion 26 of the core, and leakage across other portions of the core is negligible. Since it is possible to precalculate the reluctance of the magnetic circuit, it follows that the inductance of the primary can likewise be precalculated with assurance that an armature built in accordance with such calculations will actually perform in substantial accordance with them. In other words, it is possible to ascertain by actual computation, using the formulas given hereinabove, the number of turns that a primary should have for a given voltage and current at breaker point opening, with a given size air gap 20, assuming that the necessary data is at hand covering the magnetic characteristics of the permanent magnet element and the armature core material.

As in other magnetos, the minimum ratio of secondary turns to primary turns is determined by the ratio of voltage which must be applied across the spark plug to maximum voltage that the breaker points can handle. Thus the ratio of secondary to primary turns in the magneto of this invention is within the range of ratios heretofore employed, although the actual number of turns on each coil is of course substantially lower.

As compared with the secondaries of prior magnetos, the secondary of the magneto of this invention has a substantially lower distributed capacitance, due to its lesser number of turns, and therefore a lesser amount of energy is stored in it to be discharged at the spark plug. However its lower distributed capacitance also causes it to have a higher natural frequency (i.e., shorter time constant) so that it discharges more rapidly, with the result that it effects satisfactory sparking of the plug despite its lower energy output. As pointed out hereinabove, such lower energy discharge makes for substantially reduced erosion of the plug electrodes, or in other words, longer spark plug life, and the faster rate of voltage rise permits firing of a plug having a carbon deposit that would prevent it from being fired by prior magnetos. The lower energy content of the spark also results in lessened radio interference.

It will be very clearly apparent that the magnetic characteristics of the iron comprising the laminations of the core 19 of the magneto armature of this invention are of great importance. This follows from the fact that the flux shunt portion 26 of the core, having a low reluctance air gap 20, causes a flux field of one polarity and which is near saturation value to thread the coil supporting section 21 immediately prior to breaker point opening, and a flux field of opposite polarity, but which is likewise at or very near saturation value, to thread the coil supporting section directly after breaker point opening. This very high rate of change of flux through the coil supporting section at breaker point opening obviously makes it necessary to use for the core a material having a very low hysteresis loss. One such material which has been found satisfactory for the purpose is high silicon transformer grade steel conforming to ASTM Standard M–19.

While M–19 steel is more expensive than the Statalic or silicon-free iron heretofore satisfactorily used for the cores of many magneto armatures, and its use thus tends to detract from the attainment of low cost, which is the primary objective of this invention as applied to magnetos, nevertheless the form of the core which this invention features is responsible for such economy of material and manufacturing expenses that a core of M–19 steel for a magneto of this invention is at most only slightly higher in cost than the soft iron core of a prior type of magneto of comparable characteristics. Even if the weight of iron in the armature core of the magneto of this invention were the same as that of a comparable prior magneto, the higher cost of the M–19 steel core would be more than offset by the savings in copper. However, the core 19 is considerably smaller than that of a comparable prior magneto, owing to the much smaller size of the coils thereon, and consequently its smaller size substantially compensates for the higher price of the steel required for it. A further saving can be realized by the manner in which the laminations can be stamped from a strip 30 as illustrated in FIGURE 3, so that very little of the metal is wasted.

To facilitate assembly of the core and coils, the core is formed in two halves 19′ and 19″ which are divided from one another at the air gap 20 and along a straight parting line 31 that extends obliquely through the entire length of the coil supporting section 21. It might be pointed out that although the dividing line at 31 defines an air gap between the core halves, this gap has negligible reluctance because of its large areas and because of the close proximity of its surfaces, owing to the way the core is made.

Each of the two core halves 19′ and 19″ comprises a stack of identical laminations, and the laminations of the two stacks are mirror images of one another except that they define left and right hand coil supporting portions 21′ and 21″ respectively, each of which tapers along its length due to the oblique inclination of its longitudinal surface that engages the other core half. The coil supporting section 21′ of one core half 19′ has its oblique surface 31′ facing the pole legs 24 and 25, while the coil supporting section 21″ of the other core half 19″ has its oblique surface 31″ facing away from said pole legs. The coil supporting section of each lamination stack terminates at its outer end in a rounded head or enlargement 32 that fits snugly into a socket-like groove or opening 33 in its mating lamination stack. The width of the head portion 32 is slightly greater than that of the mouth of the groove in which it is received. Hence when the coil supporting sections 21′ and 21″ of the two complementary lamination stacks are inserted axially into a bobbin 34 upon which the coils are wound, the lamination stacks can be permanently fastened together by exerting converging pressure upon them with a press to drive the head portions 32 into the grooves 33. Snug fit of the head portions in the grooves is assured by reason of the fact that in stamping the laminations out of the strip or blank 30, each head portion comes out of the groove it is intended to occupy, as indicated at 35 in FIGURE 3. As the head portions 32 are forced into the grooves 33, the oblique surfaces 31′ and 31″ are engaged with one another under substantial bias, being pressed together with a force which is a function of their opposite oblique inclinations. Such maintenance of pressure upon the opposing surfaces 31′ and 31″ has the effect of minimizing the reluctance of the air gap between them.

A sheet of paper or the like, having a thickness corresponding to the desired air gap length, is inserted between the opposing faces of the inward extensions 28 of the flux shunt portion while the core halves are being pressed together to define the air gap 29 and control its length.

As the laminations are stamped out of the blank 39, the flux shunt portion 26 of each pair of complementary core laminations comes out of the space between the pole legs 24 and 25 of the next adjacent pair of laminations along the length of the blank, so that the only material wasted is that which comes out of the square hole 36 that accommodates the upper half of the windings, plus of course the small punchings that define the holes 37 for securement members 38 by which the core is fastened to an engine body.

The magnet element 15 which is mounted in the aluminum flywheel 9 to provide the charging flux for the magneto armature comprises a substantially U-shaped soft iron pole shoe 40 and a rectangular block magnet 41 that has one of its pole faces engaged with the bight portion of the U-shaped pole shoe. The magnet element is so disposed in the rim portion of the flywheel 9 that the legs of the pole shoe 40 extend radially outwardly, and the block magnet 41 is so oriented that the lines of flux extending therethrough are radial to the flywheel, so that the radially outermost face of the block magnet provides one of the poles of the magnet element.

Attention is directed to the unusual configuration of the block magnet, in that it is a rectangular piece of barium ferrite having its magnetic axis along its shortest dimension. Ordinarily magnetization parallel to the short dimension would be very disadvantageous because coercivity decreases with decreasing length of a permanent magnet, and the magnet of a magneto is subjected to strong demagnetizing forces due to the currents induced in the coils. However, barium ferrite, which is a ceramic type magnetic material, has an usually high coercivity; and while it is not capable of the high potential energy of Alnico, it nevertheless has very adequate flux density for magneto purposes. Barium ferrite has the additional important advantage of being relatively inexpensive, and the simple rectangular shape of the block further contributes to production economy.

The U-shaped pole shoe 40 is preferably formed from a stack of identical soft iron laminations. It has already been mentioned that the pole portions 42 at the outer ends of its legs 43 are circumferentially extended so that the poles S1 and S2 remain effectively aligned with the pole legs 24 and 25 of the armature core through substantial angles of flywheel rotation. However, the trailing pole portion S2 need not be extended to the same extent as the leading pole portion S1 and its lesser circumferential length affords a desirable saving in lamination iron. The bight portion of the pole shoe has a flat inner surface against which one flat pole face of the block magnet engages, and is of such width that a slight space or gap 44 exists between each end of the block magnet and its opposing inner face of the adjacent pole shoe leg 43, which gap can of course be filled with aluminum that is integral with the main body of the flywheel casting. When the flywheel is in rotational positions such that the magnet element is out of alignment with the armature core, its magnetic circuit extends through the two legs of the pole shoe and across the air gap between the pole portions 42 of its legs 43 and the radially outer flat pole face of the block magnet. It will be observed that this air gap is relatively small, due to the circumferential proximity of the opposite poles of the magnet element, thus minimizing the demagnetizing effect due to the air gap.

Preferably a soft iron pole piece 45 is placed over the radially outer pole face of the permanent block magnet to complement the curved peripheral surface of the flywheel and minimize the air gap between the magnet element and the pole faces of the armature core.

The metal that is removed from the bight portion of the pole member laminations can be used as a counterweight 46 at the diametrically opposite side of the flywheel from the magnet element.

In the case of the cast iron flywheel 9' shown in FIGURE 4, the block magnet 41 simply fits into a notch 50 at one side of the flywheel, only a portion of which is shown, and its magnetic circuit is through the circumferentially adjacent portions of the flywheel metal, which of course provides a magnetic rim for the flywheel, the periphery of which extends entirely around the same except for the notch 50. Hence the iron of the flywheel rim provides a single circumferentially extended pole face, and the flywheel constitutes a two pole rotor. However, the two poles are of such relative circumferential extents that as the flywheel rotates, two reversals of magnetic polarity occur in rapid succession as the pole shoe 45 and its circumferentially adjacent portions of the flywheel rim pass a fixed point on the magneto stator. Thus the cast iron flywheel 9' is identical in function to the previously described aluminum flywheel.

FIGURES 8 and 9 illustrate a battery ignition coil 71 embodying the principles of this invention and which comprises a ferromagnetic core 119 having a primary coil 122 and a secondary coil 123 wound thereon. The usual breaker points 16 are connected in series with the primary and a battery 72 that provides a source of current, and the conventional condenser 18 is connected across the breaker points. While illustrated as employed in a single-cylinder engine having one spark plug 12 connected directly with one of the secondary terminals by means of a high tension lead 29, it will be understood that a suitable distributor can be employed to adapt the device for a multi-cylinder engine. Thus the electrical connections of the device are entirely conventional.

The core upon which the coils are wound is novel, however, in that it provides means 74 defining a magnetic charging circuit in series with its coil supporting section 121, and a flux shunt portion 126 that provides a magnetic circuit in parallel with the one through the coil supporting section. More specifically the core includes a pair of legs 76 that are integral with the coil supporting section 121 and transverse thereto, one at each end thereof, and from which extend inward projections 77 that parallel the coil supporting section, embrace the exterior of the windings, and cooperate to define a short air gap 120 between their inner ends. Structurally, therefore, the flux shunt portion 126 is very similar to that in the magneto armature described above and its function is likewise similar, as will appear hereinafter.

The magnetic charging circuit means 74 comprises endwise extensions 79 of the legs 76 of the core, and a permanent magnet 78 confined between said legs and having its magnetic axis transverse to their length.

When the breaker points are closed, sending current from the battery 72 through the primary, the flux field due to the primary ampere-turns opposes that which the permanent magnet 78 tends to charge into the coil supporting section 121, and consequently both of those flux fields tend to thread the flux shunt portions 126, as illustrated in FIGURE 8. Upon opening of the breaker points, the flux field due to the primary NI collapses, and the opposite polarity field charged into the core by the magnet can thread the coil supporting section, as illustrated in FIGURE 9, thus effecting an abrupt and large magnitude flux reversal that results in the induction of a high voltage across the secondary.

It will be apparent that the functioning of the battery ignition coil is very similar to that of a magneto armature, the sole difference being that current is induced in the primary of a magneto armature by rotation of the movable permanent magnet associated therewith, but current is fed into the primary of the battery ignition coil from a battery or other low voltage D.C. source. In each instance a magnetic bias upon the core is provided at the instant of breaker point opening whereby a flux field is charged into the core which opposes the flux field that the primary tends to maintain. It follows that a structure similar to the magneto armature could be used in a battery ignition coil embodying the principles of this invention; that is, the core could be so shaped that the magnetic charging circuit means 74 could be at the side of the coil supporting section 121 which is remote from the flux shunt portion 126.

In the case of the ignition coil shown in FIGURES 8 and 9, the core is composed of two stacks of laminations divided along the length of the coil supporting section 121 and at the air gap 120, as in the magneto armature core described above, and the permanent magnet 78 is confined between suitable opposing surfaces of the two lamination stacks. A head portion 132 on the outer end of each coil supporting section 121 of the two core halves is forced into a closely fitting groove 133 in the other core half to hold the two lamination stacks assembled with their obliquely inclined opposing edges 131' and 131" engaged under pressure.

From the foregoing description taken together with the accompanying drawings it will be apparent that this invention provides an inductance device particularly intended for internal combustion engine ignition applications which is superior in performance to prior devices of comparable type, in that it affords much increased spark plug life and can produce satisfactory sparking of a plug that would otherwise be considered fouled. As embodied in a magneto the present invention provides the further important advantages of affording substantially longer breaker point life and having no tendency to produce maverick sparks. Moreover, a magneto of this invention can be manufactured at a cost lower than that of prior magnetos of the same general type, due to a very substantial reduction in the turns of the coils, a reduction in the size of its armature core, and the employment of an inexpensive barium ferrite type of permanent magnet. Those skilled in the art will also recognize that a magneto or battery ignition coil embodying the principles of this invention can be designed on the basis of actual calculations, with little or no need for cut-and-try procedures or empirical data, and that its actual performance will be in substantial accordance with design predictions.

What is claimed as my invention is:

1. An ignition magneto for an internal combustion engine comprising an armature adapted to be mounted in fixed relation to the engine and having a core of ferromagnetic material with primary and secondary windings thereon, and permanent magnet means carried by a rotatable part on the engine for recurrent orbital motion to and from juxtaposition with the core to charge flux thereinto, wherein the core of said magneto comprises: a section extending through the windings; portions extending from said section toward the orbit of the permanent magnet means and cooperating with said section and the permanent magnet means to provide a low reluctance magnetic circuit for flux due to the permanent magnet means; and other portions, connected with said section, extending around the exterior of the windings at the side thereof remote from the orbit of the permanent magnet means and defining a small air gap, said other portions providing a higher reluctance magnetic circuit, external to the windings, for flux due to the permanent magnet means.

2. In an ignition magneto for an internal combustion engine comprising permanent magnet means carried for orbital motion by a part rotatably driven by the engine, an armature mounted in fixed relation to the engine, adjacent to the orbit of the permanent magnet means, comprising: a primary winding; a secondary winding; an elongated ferromagnetic coil supporting section which extends through all of the turns of both windings; a pair of ferromagnetic pole legs connected with the opposite ends of the coil supporting section and extending toward the orbit of the permanent magnet means to cooperate therewith and with the coil supporting section in defining a low reluctance magnetic circuit for flux charged into the armature by the permanent magnet means; and ferromagnetic means cooperating with the coil supporting section to define a loop which embraces the windings and which has a short air gap in a portion thereof external to the windings, so that said last named ferromagnetic means cooperates with the pole legs in providing a higher reluctance shunt path for flux charged into the armature by the permanent magnet means, which shunt path is external to the windings, said last named ferromagnetic means being located at the side of the coil supporting section remote from the orbit of the permanent magnet means so as to be substantially completely out of the influence of leakage flux from the permanent magnet means.

3. The magneto of claim 2 wherein circuit interrupting means are connected with the terminals of the primary winding for alternately short circuiting and opening the primary winding, further characterized by the fact that the number of turns in the primary winding is so related to the reluctance of the shunt flux path defined by said last designated ferromagnetic means that the voltage and current across the circuit interrupting means during opening of the same does not exceed the maximum values for which they are rated.

4. An armature for an internal combustion engine magneto, comprising primary and secondary windings wound on a core of ferromagnetic material, characterized by the fact that: the core is substantially A-shaped, with the windings coaxially surrounding its cross bar portion and with its downwardly projecting leg portions providing pole faces at their lower ends which are cooperable with the pole pieces of a movable permanent magnet, said core having a short air gap defined by the converging portions that extend from its cross bar, and said converging portions providing a flux path around the exterior of the windings which is in shunt with the flux path provided by the cross bar portion of the A.

5. The armature of claim 4, further characterized by the fact that said core comprises two groups of laminations which are divided from one another along the length of the cross bar portion of the A as well as at said air gap.

6. An armature core for an ignition magneto of the character described, upon which primary and secondary coils are adapted to be carried, comprising: two cooperating stacks of flat laminations, the laminations of each stack being in the form of a pair of similarly oriented L-shaped elements which are integral with one another, with the stem portion of one L-shaped element connected to the other L-shaped element near the junction of the stem and base portions of said other; said two stacks of laminations having the base portions of their said other L-shaped elements lengthwise contiguous to one another to cooperate in providing a coil supporting member which is surrounded by the coils, so that the coil supporting portion of each lamination stack is within the compass of all of the coil turns; and said two stacks of laminations having the base portions of their first designated L-shaped elements extending toward one another across the exterior of coils on the coil supporting member but separated at their adjacent ends by a short air gap, so that the first designated L-shaped elements of the two lamination stacks define a low reluctance shunt flux path around the coils.

7. In an internal combustion engine ignition magneto, a laminated armature core upon which primary and secondary coils are wound and which provides a low reluctance path for flux charged into the core by permanent magnet means orbitally driven by the engine and also for flux due to current in the primary coil, and whereby such fluxes are maintained linked with the coils, said core comprising: a pair of stacks of core laminations cooperating to define an elongated coil supporting member which the coils encircle and oppositely projecting elongated transverse members at each end of the coil supporting member, the transverse members that extend in one direction terminating in pole faces cooperable with the permanent magnet means, and the transverse members that extend in the opposite direction having inward projections on their outer end portions that extend toward one another around the exterior of windings on the coil supporting member and define a short air gap between their adjacent ends; said two stacks of laminations being in surface-to-surface engagement with one another along substantially the entire length of the coil supporting portion of the core.

8. In an internal combustion engine ignition magneto, a laminated armature core upon which primary and secondary coils are wound and which provides a low reluctance path for flux charged into the core by permanent magnet means orbitally driven by the engine and also for flux due to current in the primary coil, and whereby such fluxes are maintained linked with the coils, said core comprising: a pair of stacks of core laminations, each stack having its laminations shaped to provide an elongated coil supporting portion and elongated members integral with and transverse to the coil supporting portion projecting in opposite directions from one end of the latter, the transverse member of each stack that extends in one direction terminating in a pole face cooperable with a permanent magnet, and the transverse member of the stack that extends in the other direction having at its outer end a projecting portion which extends from said transverse member in the same direction as the coil supporting portion but is substantially shorter than the latter; said two stacks of laminations having their coil supporting portions lengthwise contiguous to one another and their projecting portions extending toward one another but spaced apart at their adjacent ends to define a short air gap.

9. An ignition device for internal combustion engines comprising an armature having primary and secondary windings on a core of magnetically permeable material, and circuit interrupting means for alternately short circuiting and opening the primary winding, characterized by the fact that: the armature core has a ferromagnetic flux shunt portion which extends around the exterior of the windings and is in magnetic shunt circuit with a portion of the core that extends through the windings; and further characterized by the fact that said flux shunt portion of the core has an air gap therein which is substantially short so that the effective inductance of the primary winding when energized at the basic natural frequency of the secondary winding is above about .25 microhenrys times the square of the number of turns in the primary.

10. In an ignition magneto for an internal combustion engine comprising permanent magnet means carried for orbital motion by a part rotatably driven by the engine, an armature mounted in fixed relation to the engine, adjacent to the orbit of the permanent magnet means, comprising: a primary winding; a secondary winding; an elongated ferromagnetic coil supporting section which extends through the windings to be embraced by their turns; a pair of ferromagnetic pole legs, each connected with an end of the coil supporting section and projecting to one side thereof, toward the orbit of the permanent magnet means, to cooperate with the coil supporting section and the permanent magnet means in providing a low reluctance magnetic circuit into which flux from the permanent magnet means can be charged; and ferromagnetic means projecting from the ends of the coil supporting section to the other side thereof and extending around the exterior of the windings but defining a short air gap, said ferromagnetic means cooperating with the pole legs to define a higher reluctance path for flux due to the permanent magnet means, which path is in shunt magnetic circuit with said magnetic circuit that includes the coil supporting section.

11. In an inductance device of the type comprising primary and secondary coils, and circuit interrupting means for closing and opening a circuit permitting current to flow in the primary coil and for abruptly opening said circuit at times when a high voltage is to be induced in the secondary: a core section of ferromagnetic material which extends through all of the turns of both the primary and secondary coils; means including a permanent magnet and ferromagnetic means connected with said core section cooperating to define a magnetic charging circuit through which a magnetic flux of one polarity can be charged into said core section when the circuit interrupting means are open and no current flows in the primary coil; and other ferromagnetic means connected with the first designated ferromagnetic means and embracing the windings but defining a short air gap, said other ferromagnetic means providing a higher reluctance magnetic circuit in shunt with said core section and which can be threaded by flux due to the permanent magnet; and means for causing a current to flow in the primary coil, when the circuit interrupting means are closed, to produce a magnetic flux in said section of the core that is of a polarity to oppose the flux that the permanent magnet tends to charge thereinto, whereby both of said fluxes are caused to thread the shunt flux path in the same direction, so that upon termination of such current flow in the primary, in consequence of opening of the circuit interrupting means, there is an abrupt reversal of flux in said section of the core as magnet charged flux resumes threading the same.

12. In an inductance device of the type comprising primary and secondary coils wound on a ferromagnetic core section, and means including circuit interrupting means for closing and opening a circuit permitting current to flow in the primary coil and for abruptly opening said circuit to effect induction of a high voltage across the secondary coil: means including a permanent magnet and ferromagnetic means in series with one another and with the opposite ends of the core section, cooperating to define a magnetic charging circuit which tends to cause a magnetic flux of one polarity to thread the core section; ferromagnetic means external to the coils and connected with said opposite ends of the core section defining a high reluctance shunt flux circuit which includes a short air gap; and means for causing a current to flow in the primary coil when the circuit interrupting means are closed, to produce a magnetic flux in said core section that is of the opposite polarity to the flux which the permanent magnet tends to charge thereinto, so that both of said fluxes thread the shunt flux circuit in the same direction, and so that upon termination of such current flow in the primary, in consequence of opening of the circuit interrupting means, there is an abrupt reversal of flux in said core section as magnet charged flux resumes threading the same.

13. In an inductance device of the type comprising primary and secondary coils, and means including circuit interrupting means for closing and opening a circuit permitting current to flow in the primary coil: an elongated ferromagnetic core section extending through all of the turns of both coils; means for causing a current to flow in the primary coil when the circuit interrupting means are closed, by which current a flux of one polarity is induced in the core section; means external to the coils including ferromagnetic means and a permanent magnet arranged to be disposed in series with one another and with the core section to define a magnetic circuit through which flux of opposite polarity can be charged into the core section by the permanent magnet; and other ferromagnetic means external to the coils arranged to define with the core section a magnetic circuit having a short air gap and which is adapted to be threaded by the flux field of the permanent magnet when current flows in the primary and also by flux induced by current in the primary, so that upon termination of current flow in the primary, due to opening of the circuit interrupting means, there is an abrupt reversal of flux in the core section as flux of the permanent magnet field replaces therein the flux due to current in the primary.

14. In a battery ignition coil of the type having a primary winding in which direct current from a source thereof can flow and a secondary winding in which a high voltage can be induced in consequence of abrupt termination of current flow in the primary winding, a core comprising: ferromagnetic means defining a pair of magnetic circuits in parallel with one another, said ferromagnetic means including a portion which is in only one of said circuits that extends through all of the turns of both windings, and other portions that are in only the other of said circuits which cooperate to define a short air gap whereby said other circuit is provided with a higher reluctance than the first designated magnetic circuit; and means for charging a substantially constant magnetic flux into still another portion of the ferromagnetic means that is common to both of said magnetic circuits.

15. In a battery ignition coil of the type having a primary winding in which direct current from a source thereof can flow and a secondary winding in which a high voltage can be induced in consequence of abrupt termination of current flow in the primary winding, a core comprising: an elongated ferromagnetic core section extending through all of the turns of both windings; a pair of ferromagnetic portions connected with said core section at the ends thereof and extending substantially transversely thereto; a permanent magnet having a pair of pole faces of opposite polarity, each engaging one of said ferromagnetic portions, said magnet cooperating with the ferromagnetic portions and with the core section to define a closed loop linked with the windings which provides a magnetic circuit for flux due to the permanent magnet; and ferromagnetic means connected with said transversely extending portions and cooperating therewith and with the permanent magnet to define a second loop external to the windings, providing a second magnetic circuit for flux due to the permanent magnet, in shunt with the magnetic circuit provided by the first loop, said last named ferromagnetic means cooperating to define a short air gap in the second loop that provides the second magnetic circuit with a higher reluctance than the first mentioned magnetic circuit.

16. A battery ignition coil of the type having a primary winding in which direct current from a source thereof can flow, a secondary winding in which a high voltage can be induced upon abrupt termination of current flow in the primary winding, and a core upon which the primary and secondary windings are wound, wherein the core comprises: a permanent magnetic having pole faces of opposite magnetic polarity; ferromagnetic means having one portion which extends through all of the turns of both windings, and other portions which extend from said one portion and terminate in end surfaces that engage the pole faces of the magnet, so that said ferromagnetic means cooperates with the permanent magnet in defining a closed loop linked through the windings and provides a low reluctance magnetic circuit which can be threaded by flux from the permanent magnet; and other ferromagnetic means connected with said first designated ferromagnetic means at opposite sides of the permanent magnet and cooperating with said first designated ferromagnetic means and the permanent magnet to define a second loop that includes a short air gap and which provides a higher reluctance magnetic circuit for flux from the permanent magnet in shunt with that defined by the first designated ferromagnetic means.

17. In an inductance device having coaxial coils, a ferromagnetic core upon which the coils are supported and which provides a magnetic circuit for flux linked with the coils having an air gap of predeterminable size said core comprising: a pair of lamination stacks, each having a coil supporting leg extending through the coils, a second leg connected with one end of the coil supporting leg and extending substantially perpendicularly thereto to overlie one end of the coils, and a projecting portion on said second leg which extends therefrom in the same direction as the coil supporting leg and is laterally spaced from the latter to overlie the exterior of the coils; and cooperating tongue-and-groove means on the other end of the coil supporting leg of one lamination stack and on a portion of the other lamination stack which is adjacent to the junction of its coil supporting leg and its second leg, said tongue-and-groove means being engaged with a force fit and holding the two lamination stacks assembled with their second legs overlying opposite ends of the coils and their coil supporting legs in surface-to-surface engagement with one another along their lengths, and with their projecting portions extending toward one another across the exterior of the coils and cooperating to define an air gap between their adjacent ends.

18. A ferromagnetic core for an inductance device, upon which coaxial coils are supported and which provides a magnetic circuit for flux linked with the coils having an air gap of predeterminable size, said core comprising: a pair of lamination stacks, each having a leg portion extending across an end of the coils, a coil supporting portion extending from said leg portion, substantially perpendicularly thereto, and projecting into the coils, and an air gap defining portion projecting from said leg portion in the same direction as the coil supporting portion and laterally spaced from the latter, overlying the exterior of the coils; the coil supporting portion of each lamination stack being tapered along its length from the leg portion to provide a surface which is inclined to the coil axis, and having at its end remote from the leg portion an enlarged head; said two lamination stacks being held assembled with their leg portions overlying opposite ends of the coils by having the head on each snugly received in a closely fitting groove in the other, and having their said surfaces in surface-to-surface engagement with one another under pressure and their air gap defining portions projecting toward one another across the exterior of the coils and defining an air gap between their adjacent ends.

19. A ferromagnetic core for an inductance device, upon which coaxial coils are supported and which provides a magnetic circuit for flux linked with the coils having an air gap of predeterminable size, said core comprising: a pair of lamination stacks, each having a first section that overlies an end of the coils, a coil supporting leg projecting into the coils from said first section, and an air gap defining leg, laterally spaced from the coil supporting leg, projecting across the exterior of the coils from the first section; the coil supporting leg of each lamination stack being tapered along its length from the first section to provide opposing surfaces on the coil supporting legs of the two stacks which are in surface-to-surface engagement with one another and which are inclined to the coil axis; and means on the lamination stacks holding them assembled with one another with their air gap defining portions projecting toward one another across the exterior of the coils and defining an air gap between their adjacent ends, said means maintaining a converging force on the lamination stacks parallel to the coil axis so that said inclined surfaces on the coil supporting legs of the two stacks are held engaged under pressure by which the reluctance of the air gap between them is minimized.

20. An inductance device comprising a coil and a ferromagnetic core having an elongated section coaxially embraced by the coil and other sections connected with said elongated section, extending transversely thereto and overlying the ends of the coil, said inductance device being characterized by the fact that its ferromagnetic core comprises: two complementary stacks of laminations, the laminations comprising each stack being identical with one another, and the laminations of each stack being shaped to provide the stack with a coil supporting leg which projects a substantial distance into the coil from one end thereof and another leg connected with the outer end of the coil supporting leg and which provides one of said other sections and overlies said end of the coil; and cooperating tongue-and-groove means on the other end of the coil supporting leg of one lamination stack and on a portion of the other lamination stack which is adjacent to the junction of its coil supporting leg and its other leg, said tongue-and-groove means being engaged with a force fit and holding the two lamination stacks assembled with their coil supporting legs in tight surface-to-surface engagement with one another along their lengths.

21. The inductance device of claim 20, further characterized by the fact that the coil supporting leg of one of said lamination stacks tapers along its length from its outer end and has a surface which opposingly engages a complementary surface on the coil supporting leg on the other lamination stack and which is inclined to the coil axis, whereby the opposingly engaged surfaces of the coil supporting legs of the two stacks have large areas that minimize the reluctance between them.

References Cited in the file of this patent

UNITED STATES PATENTS

| | | |
|---|---|---|
| 553,847 | Freeman | Feb. 4, 1896 |
| 2,348,003 | Granfield | May 2, 1944 |
| 2,458,336 | Brownlee | Jan. 4, 1949 |
| 2,466,028 | Klemperer | Apr. 5, 1949 |
| 2,482,875 | Sawyer | Sept. 27, 1949 |
| 2,712,084 | Bridenbaugh | June 28, 1955 |
| 2,725,520 | Woodworth | Nov. 29, 1955 |

FOREIGN PATENTS

| | | |
|---|---|---|
| 946,195 | Germany | July 26, 1956 |
| 1,011,193 | France | Apr. 2, 1952 |

UNITED STATES PATENT OFFICE
CERTIFICATE OF CORRECTION

Patent No. 3,114,851                          December 17, 1963

John D. Santi

It is hereby certified that error appears in the above numbered patent requiring correction and that the said Letters Patent should read as corrected below.

Figure 5:
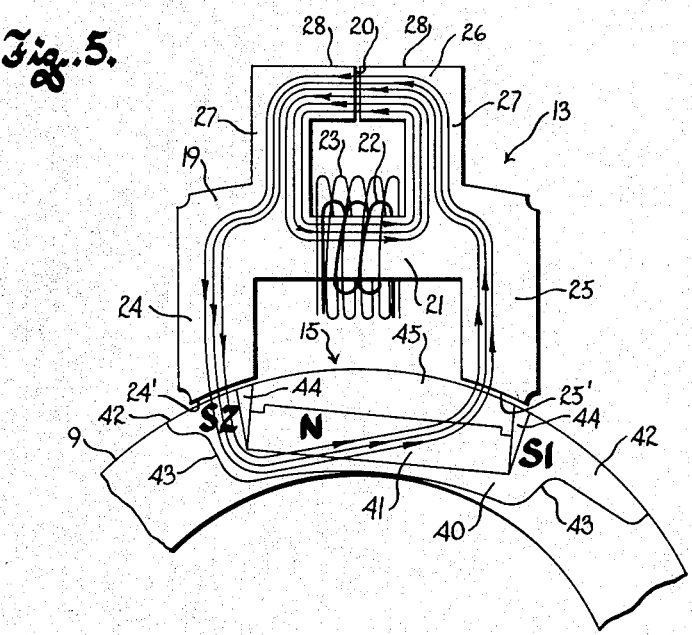
FIGURE 5 is a diagrammatic view of the flywheel magneto shown in FIGURE 1, illustrating the flux fields in the armature core immediately prior to breaker point opening.

Column 5, line 40, for "FIGURE 5" read -- FIGURE 7 --.

Signed and sealed this 21st day of July 1964.

(SEAL)

Attest:

ESTON G. JOHNSON                          EDWARD J. BRENNER
Attesting Officer                            Commissioner of Patents